DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 9

T903,022
PHOTOSENSITIVE DIAZONIUM SALTS OF XANTHENE DYES

Douglas G. Borden, % Kodak Park Research Laboratories, Rochester, N.Y. 14650

Filed Feb. 1, 1972, Ser. No. 222,649
**Int. Cl. G03c *1/52***
U.S. Cl. 96—91 R
No Drawing. 9 Pages Specification

Diazonium salts are spectrally sensitized by forming a diazonium xanthene dye complex by reacting an aqueous solution of a diazonium cation, which contains an imino group para to the diazonium group, with an aqueous solution of a xanthene dye anion and collecting the precipitate. Suitable diazonium cations include those which have the structure

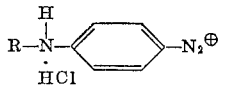

where R is alkyl, aralkyl, or aryl. Typical diazonium salts are 4-ethylaminobenzenediazonium chlorozincate and 4-phenylaminobenzenediazonium sulfate. Suitable xanthene dye anions include those which have the structure

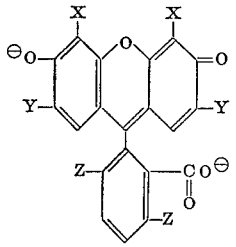

where X, Y and Z are each independently hydrogen or halogen. Typical xanthene dyes are fluorescein, eosin, rose bengal and erythrosin. The photodecomposition products of the complexes are ink accepting and can be used as is, or optionally with a binder, in the preparation of planographic printing plates.